(12) United States Patent
Seto

(10) Patent No.: US 6,470,257 B1
(45) Date of Patent: Oct. 22, 2002

(54) ADAPTIVE CRUISE CONTROL SYSTEM FOR AUTOMOTIVE VEHICLES

(75) Inventor: Yoji Seto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/106,026

(22) Filed: Mar. 27, 2002

(30) Foreign Application Priority Data

Apr. 16, 2001 (JP) ........................................ 2001-116675

(51) Int. Cl.⁷ ................................................ B60T 7/12
(52) U.S. Cl. ........................................................ 701/96
(58) Field of Search ............................. 701/96, 93, 94, 701/95, 300, 301; 340/903, 435; 342/69, 70; 180/169, 170, 171; 318/587

(56) References Cited

U.S. PATENT DOCUMENTS

| | | | |
|---|---|---|---|
| 6,339,740 B1 | * | 1/2002 | Seto et al. ..................... 701/96 |
| 6,345,227 B1 | * | 2/2002 | Egawa et al. ................. 701/96 |
| 6,347,274 B2 | * | 2/2002 | Kubomochi et al. .......... 701/96 |
| 6,351,702 B1 | * | 2/2002 | Tange et al. ................... 701/96 |
| 6,374,174 B2 | * | 4/2002 | Hellman ....................... 701/96 |

FOREIGN PATENT DOCUMENTS

JP    11-334554    12/1999

* cited by examiner

Primary Examiner—Richard M. Camby
(74) Attorney, Agent, or Firm—Foley & Lardner

(57) ABSTRACT

An adaptive cruise control system for an automotive vehicle includes at least a host vehicle speed detector an engine torque control system and a brake control system for controlling at least one of a host vehicle's speed, an inter-vehicle distance, and a relative velocity of the host vehicle to the preceding vehicle. When switching from an engine-torque-control-only operating mode suitable for a relatively small required host vehicle's acceleration/deceleration to an engine-torque-control plus brake-control operating mode suitable for a relatively large required host vehicle's acceleration/deceleration occurs, an initial value of a host vehicle's speed command value is reset to a value being offset from the host vehicle's speed by a predetermined value.

12 Claims, 4 Drawing Sheets

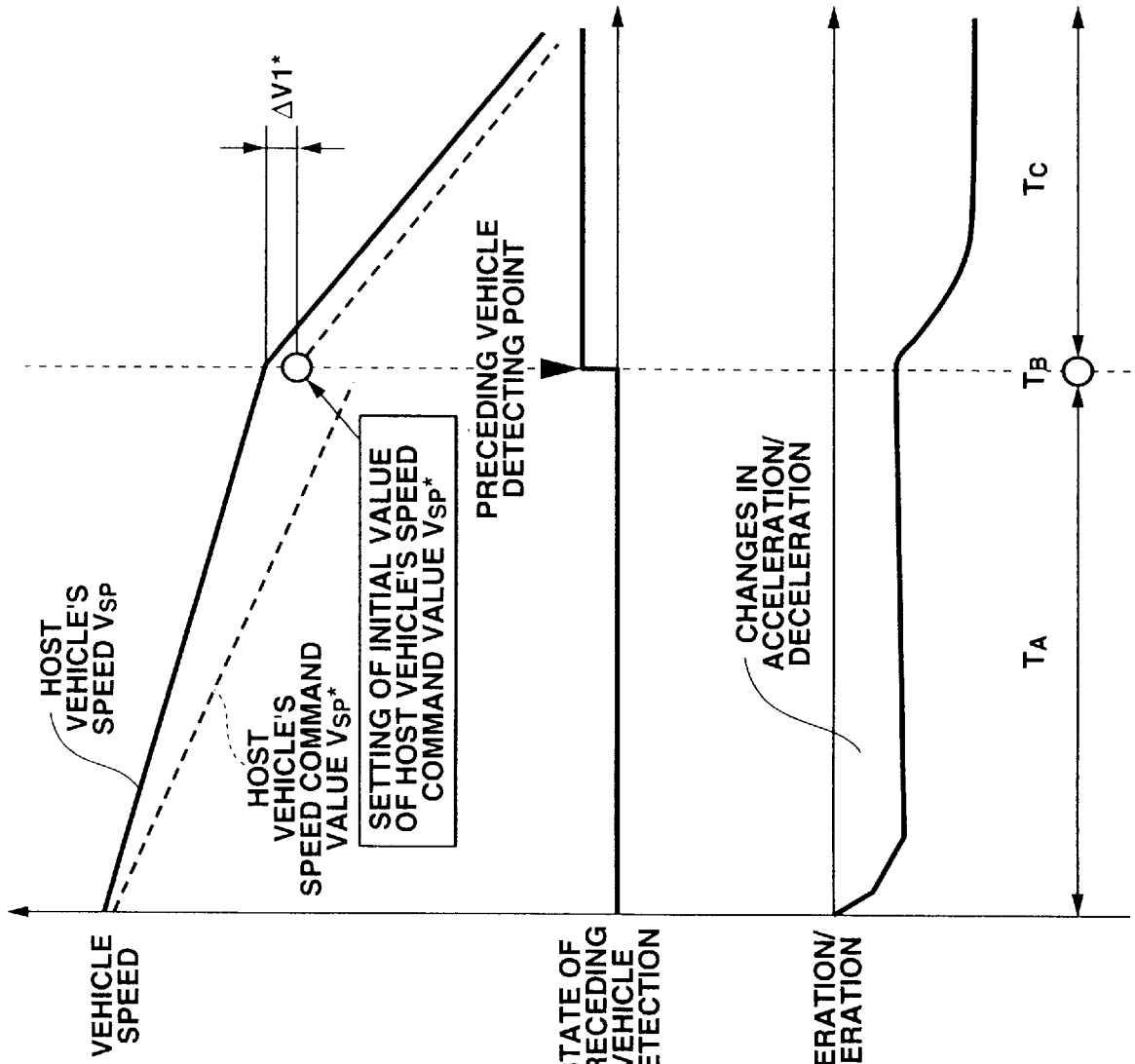

ADAPTIVE CRUISE CONTROL SYSTEM FOR AUTOMOTIVE VEHICLES

TECHNICAL FIELD

The present invention relates to an adaptive cruise control system for automotive vehicles, and particularly to an adaptive cruise control (ACC) system capable of performing transmission ratio control, engine control and/or brake control, for controlling the host vehicle's speed and the host vehicle's distance from a preceding vehicle, often called an "inter-vehicle distance" or a "vehicle-to-vehicle distance".

BACKGROUND ART

In recent years, there have been proposed and developed various inter-vehicle distance control systems or automatic following control systems that the host vehicle (ACC vehicle) can automatically follow a preceding vehicle. Such an inter-vehicle distance control system of ten controls the inter-vehicle distance by a combination of transmission ratio control, brake control, and engine control (throttle control) in presence of preceding vehicle detection or frontal vehicular detection, and controls the host vehicle's speed by only the engine control in absence of the preceding vehicle detection. In another type of adaptive cruise control (ACC) system having an automatic following control function, disclosed in Japanese Patent Provisional Publication No. 11-334554 (hereinafter is referred to as "JP11-334554"), in order to more smoothly execute the automatic following control without a feeling of physical disorder irrespective of changes in a running condition of the preceding vehicle, when switching a desired deceleration rate $\alpha_e$ of the host vehicle between a first desired deceleration rate $\alpha_{ec}$ suitable for a first state that the preceding vehicle is in a constant-speed running state and a second desired deceleration rate $\alpha_{er}$ suitable for a second state that the preceding vehicle is in a decelerating state, the system operates to gradually switch the desired deceleration rate $\alpha_e$ of the host vehicle from one of first and second desired deceleration rates $\alpha_{ec}$ and $\alpha_{er}$ to the other.

SUMMARY OF THE INVENTION

In the adaptive cruise control system disclosed in JP11-334554, concretely when the running state of the preceding vehicle shifts from the constant-speed running state to the decelerating state, a desired deceleration rate $\alpha_e$ of the host vehicle is calculated as a weighted mean of the first desired deceleration rate $\alpha_{ec}$ and the second desired deceleration rate $\alpha_{er}$. Therefore, when shifting the constant-speed running state to a decelerating state of a comparatively small demand for deceleration, the conventional system of JP11-334554 can realize a smooth change in the deceleration rate of the host vehicle. In contrast, when shifting the constant-speed running state to a decelerating state of a comparatively large demand for deceleration, there is an increased tendency for a timing at which a decelerating operation of the host vehicle is initiated to be retarded, or there is an increased tendency for the magnitude of the deceleration rate of the host vehicle to be undesiredly reduced.

Accordingly, it is an object of the invention to provide an adaptive cruise control system for an automotive vehicle, which avoids the aforementioned disadvantages.

It is another object of the invention to provide an adaptive cruise control system, which is capable of achieve a smooth transition from one of first and second control modes (or one of an engine-torque-control-only operating mode and an engine-torque-control plus brake-control operating mode) to the other, ensuring a high control responsiveness for a demand for acceleration/deceleration and effectively suppressing changes in acceleration/deceleration of a host vehicle and.

In order to accomplish the aforementioned and other objects of the present invention, an adaptive cruise control system for an automotive vehicle, comprises a vehicle speed detector that detects a host vehicle's speed, a man-machine interface that sets a desired host vehicle speed, a plurality of braking-and-driving force control systems that control a braking-and-driving force of the host vehicle, so that the host vehicle's speed is brought closer to the desired host vehicle speed, and a controller configured to be electronically connected to the vehicle speed detector, the man-machine interface, and the plurality of braking-and-driving force control systems, for executing an adaptive cruise control, the controller comprising a braking-and-driving force control mode selector that selects at least one braking-and-driving force control system from the plurality of braking-and-driving force control systems, depending upon a host vehicle's acceleration/deceleration required to bring the host vehicle's speed closer to the desired host vehicle speed, the braking-and-driving force control mode selector selecting a first braking-and-driving force control system when the required host vehicle's acceleration/deceleration is less than a predetermined threshold value, and selecting a second braking-and-driving force control system when the required host vehicle's acceleration/deceleration is greater than or equal to the predetermined threshold value, and a desired host vehicle speed compensator that resets the desired host vehicle speed set at a switching point between the first and second braking-and-driving force control systems at a value being offset from the host vehicle's speed by a predetermined value when switching between the first and second braking-and-driving force control systems occurs.

According to another aspect of the invention, an adaptive cruise control system for an automotive vehicle, comprises an inter-vehicle distance detector that detects an inter-vehicle distance between a host vehicle and a preceding vehicle, a vehicle speed detector that detects a host vehicle's speed, a plurality of braking-and-driving force control systems that control a braking-and-driving force of the host vehicle, so that the host vehicle's speed is brought closer to a desired host vehicle speed, and a controller configured to be electronically connected to the inter-vehicle distance detector, the vehicle speed detector, and the plurality of braking-and-driving force control systems, for executing an adaptive cruise control, the controller comprising a desired inter-vehicle distance setting section that sets a desired inter-vehicle distance from the host vehicle to the preceding vehicle, a desired host vehicle speed computation section that computes the desired host vehicle speed needed to bring the inter-vehicle distance closer to the desired inter-vehicle distance, a braking-and-driving force control mode selector that selects at least one braking-and-driving force control system from the plurality of braking-and-driving force control systems, depending upon a host vehicle's acceleration/deceleration required to bring the host vehicle's speed closer to the desired host vehicle speed, the braking-and-driving force control mode selector selecting a first braking-and-driving force control system when the required host vehicle's acceleration/deceleration is less than a predetermined threshold value, and selecting a second braking-and-driving force control system when the required host vehicle's acceleration/deceleration is greater than or equal to the predetermined threshold value, and a desired host vehicle speed compensator that resets the desired host vehicle speed computed at a switching point between the first and second braking-and-driving force control systems at a value being offset from the host vehicle's speed by a predetermined value when switching between the first and second braking-and-driving force control systems occurs.

According to a further aspect of the invention, a method for automatically controlling at least one of a host vehicle's speed, an inter-vehicle distance between the host vehicle and a preceding vehicle, and a relative velocity of the host vehicle to the preceding vehicle, the method comprising detecting the host vehicle's speed, detecting the inter-vehicle distance, detecting the relative velocity, computing a first desired host vehicle speed based on a driver-selected vehicle speed, computing a second desired host vehicle speed based on the inter-vehicle distance and the relative velocity, setting a desired host vehicle speed at the first desired host vehicle speed when the preceding vehicle is absent, setting the desired host vehicle speed at the second desired host vehicle speed when the preceding vehicle is present, selecting a first braking-and-driving force control mode suitable for a first demand for acceleration/deceleration when a required host vehicle's acceleration/deceleration is less than a predetermined threshold value, selecting a second braking-and-driving force control mode suitable for a second demand greater than the first demand for acceleration/deceleration when the required host vehicle's acceleration/deceleration is greater than or equal to the predetermined threshold value, and resetting the desired host vehicle speed computed at a switching point between the first and second braking-and-driving force control modes at a value being offset from the host vehicle's speed by a predetermined value when switching between the first and second braking-and-driving force control modes occurs.

The other objects and features of this invention will become understood from the following description with reference to the accompanying drawings.

BRIEF DESCRIPTION OF THE DRAWINGS

FIG. 5A is a time chart showing the relationship between a host vehicle's speed Vsp and a host vehicle's speed command value Vsp*, obtained when shifting from the engine-torque-control-only operating mode to the engine-torque-control plus brake-control operating mode in the system of the embodiment.

FIG. 5B is a time chart showing a point of time when the preceding vehicle is detected.

FIG. 5C is a time chart showing a characteristic curve of changes in acceleration/deceleration.

DESCRIPTION OF THE PREFERRED EMBODIMENTS

Figure 1:
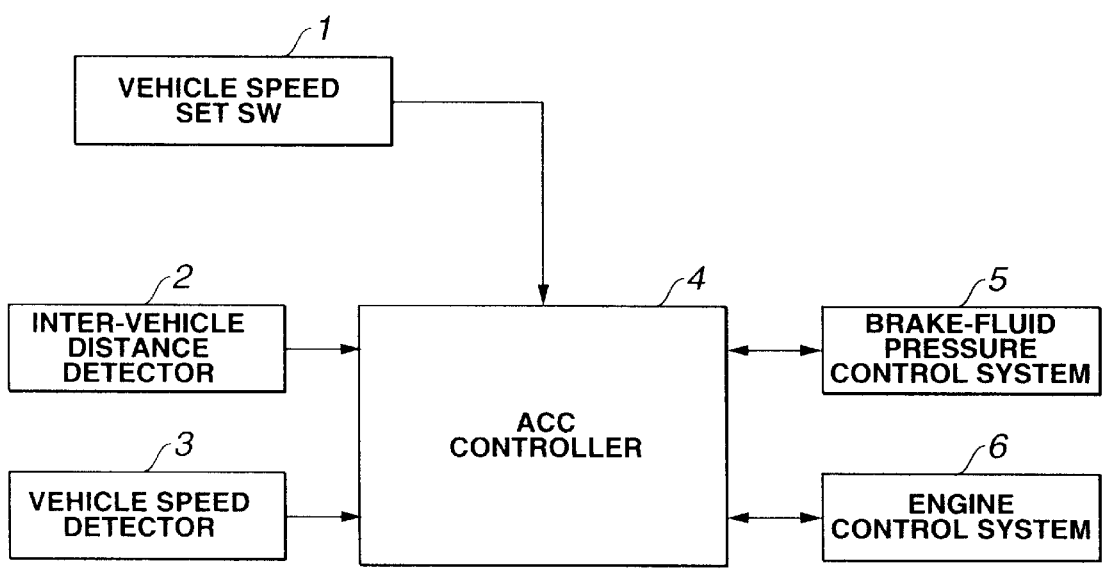
FIG. 1 is a system block diagram showing one embodiment of the adaptive cruise control system interacting with a brake fluid pressure control system and an engine control system.

Referring now to the drawings, particularly to FIG. 1, there is shown the system block diagram of the automotive adaptive cruise control system of the embodiment. As hereinafter described in detail, the adaptive cruise control system of the embodiment makes a judgment on the presence or absence of the preceding vehicle (or relevant target vehicle) or a frontally located object. The adaptive cruise control system of the embodiment controls the host vehicle's speed by only the engine control (exactly, engine torque control) in absence of the preceding vehicle detection, so that the host vehicle speed is adjusted or brought closer to the driver-selected host vehicle speed set by the driver.

Conversely in presence of the preceding vehicle detection, a desired inter-vehicle distance D* is calculated so that a time-to-collision-contact, which will be hereinafter referred to as an "inter-vehicle time", is maintained at a predetermined constant time Th. The inter-vehicle time (time-to-collision-contact) represents an elapsed time before the host vehicle is brought into collision-contact with the preceding vehicle or the frontally located object. The inter-vehicle time is usually arithmetically calculated from an expression TC=D/(dD/dt), where TC denotes the inter-vehicle time, D denotes an actual relative distance (or an actual inter-vehicle distance), and a derivative dD/dt of actual relative distance D is calculated as a rate of change dD/dt of actual relative distance D with respect to t. The time rate of change dD/dt corresponds to a relative velocity $\Delta V$ of the host vehicle to the preceding vehicle (or the frontally located object). The driver-selected host vehicle speed is set as an upper limit of the host vehicle speed, and additionally a desired host vehicle speed V1* is calculated in such a manner as to maintain the desired inter-vehicle distance D* calculated. The system of the embodiment executes the adaptive cruise control (concretely, the inter-vehicle distance control) by way of a combination of the engine torque control and brake control (brake torque control), so that the host vehicle speed is brought closer to desired host vehicle speed V1*. That is, the system of the embodiment properly selects either of the host vehicle's control and the inter-vehicle distance control, depending on the presence or absence of the preceding vehicle detection.

As shown in FIG. 1, the adaptive cruise control system of the embodiment includes a vehicle speed set switch (serving as a desired host vehicle speed setting means) 1, an inter-vehicle distance detector (serving as an inter-vehicle distance detecting means and a relative velocity detecting means) 2, a vehicle speed detector (serving as a host vehicle's speed detecting means) 3, an adaptive cruise control (ACC) controller 4, a brake-fluid pressure control system 5, and an engine control system 6. Vehicle speed set switch 1 is located substantially at the central position of the steering wheel. Vehicle speed set switch 1 is comprised of a set switch portion needed to set the desired host vehicle speed V1* (a set host vehicle speed) by way of manual operation of the driver during driving of the vehicle, an accelerate switch portion needed to increase the. desired host vehicle speed V1* by a set value $\Delta V_{up}$* by way of manual operation of the driver during the adaptive cruise control, and a coast switch portion needed to decrease the desired host vehicle speed V1* by a set value $\Delta V_{down}$* by way of manual operation of the driver during the adaptive cruise control. As appreciated, the previously-discussed three operation switches, that is, the set switch portion, the accelerate switch portion, and the coast switch portion, function as a man-machine interface for manually setting the desired host vehicle speed.

Inter-vehicle distance detector 2 functions to detect the presence or absence of the preceding vehicle. That is, inter-vehicle distance detector 2 is used as an object detector that captures, recognizes. or detects the preceding vehicle (or relevant target vehicle) or a frontally located object. When the preceding vehicle is captured by means of inter-vehicle distance detector 2, the inter-vehicle distance detector further functions to detect or monitor an inter-vehicle distance D (a vehicle-to-vehicle distance or a separating distance between the host vehicle and the preceding vehicle or a relative distance of the frontally located object or the preceding vehicle relative to the host vehicle), and to detect or monitor a relative velocity ΔV of the host vehicle relative to the preceding vehicle. Actually, inter-vehicle distance detector 2 is comprised of a frontal object detector section (frontal objector detecting means) and a frontal object detector signal processing circuit (frontal object detector signal processing means). A scanning laser radar sensor is used as the frontal object detector section so as to capture, recognize, sense or detect the preceding vehicle or a frontally located object. The previously-noted frontal object detector signal processing circuit receives an input signal from the frontal object detector section and processes the input signal to determine the presence or absence of the preceding vehicle, so as to derive inter-vehicle distance D as well as relative velocity ΔV. As is generally known, the scanning laser radar sensor includes a scanning device, containing both a transmitter and a receiver. The scanning device of the laser radar sensor transmits a pulse of light (laser beam) in a horizontal line, back and forth. The scanning device measures the time of flight of the pulse of light, and then the relative distance or the inter-vehicle distance is calculated on the basis of the time interval from the transmitted pulse (the time when the laser beam is emitted from the host vehicle) to the received pulse (the time when the receiver receives the laser wave reflected from the preceding vehicle). Instead of the use of the scanning laser radar, a millimeter-wave radar sensor may be used for object detection. Alternatively, by image-processing image data of a stereo camera using a charge-coupled device (CCD) image sensor, the system is able to determine the host vehicle's distance from the preceding vehicle, that is, inter-vehicle distance D between the host vehicle and the preceding vehicle.

Vehicle speed detector 3 is comprised of a vehicle speed sensor that detects an actual host vehicle's speed (simply, a host vehicle's speed) Vsp, and a vehicle speed sensor signal processing circuit that processes the vehicle speed sensor signal to derive host vehicle's speed data Vsp.

Adaptive cruise control controller (ACC controller) 4 generally comprises a microcomputer. ACC controller 4 includes an input/output interface (I/O), memories (RAM, ROM), and a microprocessor or a central processing unit (CPU). The input/output interface (I/O) of ACC controller 4 receives input information from various engine/vehicle switches and sensors, namely vehicle speed set switch 1, inter-vehicle distance detector 2, and vehicle speed detector 3. Within the ACC controller, the central processing unit (CPU) allows the access by the I/O interface of input informational data signals from vehicle speed set switch 1, inter-vehicle distance detector 2, and vehicle speed detector 3. Then, the CPU of ACC controller 4 is responsible for carrying the engine-torque-control/brake-fluid-pressure control program stored in memories and is capable of performing necessary arithmetic and logic operations containing an adaptive cruise control management processing including electronic engine torque control achieved through engine control system (engine torque control system) 6 as well as active brake control achieved through brake-fluid pressure control system (brake torque control system or simply, brake control system) 5. Computational results (arithmetic calculation results), that is, calculated output signals are relayed via the output interface circuitry of the ACC controller to output stages, namely a throttle valve actuator included in engine control system 6 and electromagnetic solenoids constructing part of a hydraulic modulator (or a brake-fluid servo system) included in brake-fluid pressure control system 5. The adaptive cruise control management processing is executed as a main program by the CPU of ACC controller 4. Brake-fluid pressure control system 5 receives a brake-fluid pressure command signal representative of a brake-fluid pressure command value Pbr from the output interface circuitry of the ACC controller, to produce a brake-fluid pressure (a wheel-brake cylinder pressure) based on command value Pbr, and to apply a braking force (or braking torque) based on the brake-fluid pressure command value Pbr to roadwheels. On the other hand, engine control system 6 receives a throttle opening command signal representative of a throttle opening command value θr from the output interface circuitry of the ACC controller, to adjust the throttle opening of the throttle valve located in the induction system of the engine mounted on the vehicle on the basis of throttle opening command value θr. In the shown embodiment, only the engine control system 6 corresponds to a first braking-and-driving force control means performing the engine-torque-control-only operating mode. Engine control system 6 and brake-fluid pressure control system 5 both correspond to a second braking-and-driving force control means performing the engine-torque-control plus brake-control operating mode.

Figure 2:
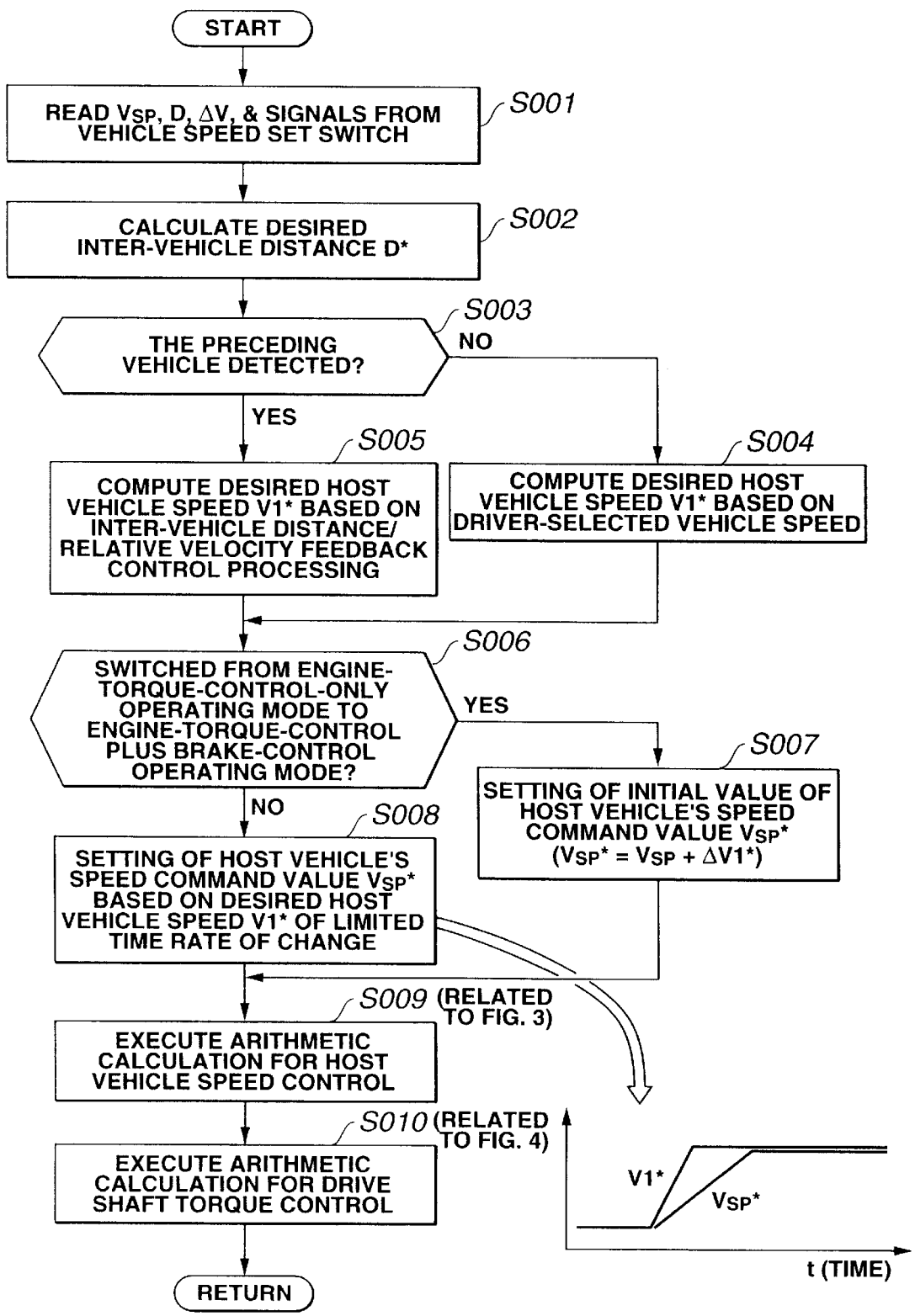
FIG. 2 is a flow chart illustrating a control routine executed within the adaptive cruise control system of the embodiment of FIG. 1.

Referring now to FIG. 2, there is shown the adaptive cruise control management processing executed by the CPU of ACC controller 4.

At step S001, host vehicle's speed Vsp detected by vehicle speed detector 3, inter-vehicle distance D and relative velocity ΔV both detected by inter-vehicle distance detector 2, and signal values of switch signals from vehicle speed set switch 1 comprised of the set switch portion, the accelerate switch portion, and the coast switch portion are read.

At step S002, desired inter-vehicle distance D* is calculated from the following expression, so that the inter-vehicle time (time-to-collision-contact) is maintained at the predetermined constant time Th such as 2 seconds during the adaptive cruise control in the presence of the preceding vehicle detection.

$$D^* = Th \times Vsp$$

where D* denotes the desired inter-vehicle distance, Th denotes the predetermined constant inter-vehicle time, and Vsp denotes the current value of the host vehicle's speed (the latest up-to-date information data signal from vehicle speed detector 3). As discussed above, step S002 serves as a desired inter-vehicle distance setting section (desired inter-vehicle distance setting means) that sets desired inter-vehicle distance D* from the host vehicle to the preceding vehicle.

At step S003, a check is made to determine whether or not the preceding vehicle is detected or captured by means of inter-vehicle distance detector 2. In absence of the preceding vehicle detection, the routine proceeds from step S003 to step S004. Conversely, in presence of the preceding vehicle detection, the routine proceeds from step S003 to step S005.

At step S004, the desired host vehicle speed V1* is computed or determined based on the set vehicle speed selected by manual operation of the driver via vehicle speed set switch 1. For instance, if the driver operates the accelerate switch portion, the desired host vehicle speed V1* is increased by the set value $\Delta V_{up}*$. Conversely, if the driver operates the coast switch portion, the desired host vehicle speed V1* is decreased by the set value A $V_{down}*$.

At step S005, the desired host vehicle speed V1* is computed based on the actual inter-vehicle distance (or actual relative distance) D, the desired inter-vehicle distance D*, the relative velocity $\Delta V$ of the host vehicle to the preceding vehicle, and the host vehicle's speed Vsp, from the following arithmetic expression for inter-vehicle distance/relative velocity feedback control processing, such that actual inter-vehicle distance D and actual relative velocity $\Delta V$ are properly adjusted to match or attain the desired inter-vehicle distance D*. As described previously, relative velocity $\Delta V$ can be calculated as a rate of change dD/dt of actual relative distance D with respect to t.

$$V1* = K_L(D-D*) + K_V \cdot \Delta V + Vsp$$

where KL denotes an inter-vehicle distance feedback gain, and Kv denotes a relative velocity feedback gain. The previously-noted steps S004 and S005 serve as a desired host vehicle speed computation section (desired host vehicle speed computation means) that computes the desired host vehicle speed V1*.

At step S006, a check is made to determine whether switching from the engine-torque-control-only operating mode (an engine-control-only braking/driving force control mode, in other words, the absence of the preceding vehicle detection) to the engine-torque-control plus brake-control operating mode (an engine-control plus brake-control braking/driving force control mode, in other words, the presence of the preceding vehicle detection) occurs. When the answer to step S006 is in the affirmative (YES), the routine flows from step S006 to step S007. Conversely when the answer to step S006 is in the negative (NO), the routine flows from step S006 to step S008.

Briefly, the processor of the ACC controller incorporated in the system of the embodiment operates to select a first braking-and-driving force control (the engine-control-only braking/driving force control mode) in case that a required acceleration/deceleration value is small in the absence of the preceding vehicle detection, and to select a second braking-and-driving force control (the engine-control plus brake-control braking/driving force control mode) in case that the required acceleration/deceleration value is large in the presence of the preceding vehicle detection. That is, the processor of the ACC controller has a braking-and-driving force control mode selector (a braking-and-driving force control mode selection means) that properly selects a system operating mode from the first and second braking-and-driving force control modes depending upon the magnitude of the host vehicle's acceleration/deceleration needed to bring host vehicle's speed Vsp closer to desired host vehicle speed V1*.

At step S007, as will be appreciated from the following expression, an initial value of host vehicle's speed command value Vsp* is reset at a value being offset from the current value of the host vehicle's speed by a predetermined value $\Delta V1*$.

$$Vsp* = Vsp + \Delta V1*$$

where $\Delta V1*$ is obtained by the expression $\Delta V1* = \tau_B \times A + K_{L1}(D-D*) + K_{V1} \cdot \Delta V$, where $\tau_B$ represents a value that is determined depending upon a responsiveness of host vehicle's speed Vsp to host vehicle's speed command value Vsp*. In the system of the shown embodiment, the value $\tau_B$ is determined by the expression $\tau_B = Mv/Ksp$, where Mv denotes a vehicle weight, and Ksp denotes a fixed gain for the vehicle speed control section ① (described later). A is an acceleration/deceleration value of the host vehicle just before switching from the engine-torque-control-only operating mode to the engine-torque-control plus brake-control operating mode. In the system of the shown embodiment, the acceleration/deceleration value A is estimated or calculated as a time rate of change in host vehicle's speed Vsp, that is, dVsp/dt. In lieu thereof, the acceleration/deceleration value A may be measured directly by means of a longitudinal acceleration sensor (longitudinal G sensor). As discussed above, the system of the embodiment has a host vehicle's acceleration/deceleration detection section (host vehicle's acceleration/deceleration detection means) that detects or estimates the host vehicle's acceleration/deceleration. $K_{L1}$ and $K_{V1}$ are constants. $K_{L1}$ is an inter-vehicle distance feedback gain used for arithmetic calculation for the initial value of host vehicle's speed command value Vsp*, whereas $K_{V1}$ is a relative velocity feedback gain used for arithmetic calculation for the initial value of host vehicle's speed command value Vsp*. As set forth above, step S007 serves as a desired host vehicle speed compensator (desired host vehicle speed compensating means) that resets the desired host vehicle speed set at a switching point between the first and second braking-and-driving force control means at a value being offset from the host vehicle's speed by predetermined value $\Delta V1*$ when switching between the first and second braking-and-driving force control systems occurs.

At step S008, in order to prevent the acceleration/deceleration value of the host vehicle from exceeding a predetermined limit value, the time rate of change in desired host vehicle speed V1* in the positive direction is limited by a predetermined upper limit. The time rate of change in desired host vehicle speed V1* in the negative direction is limited by a predetermined lower limit. Host vehicle's speed command value Vsp* is set based on the desired host vehicle speed V1* of the limited time rate of change (see the lower-right graph of step S008).

Figure 3:
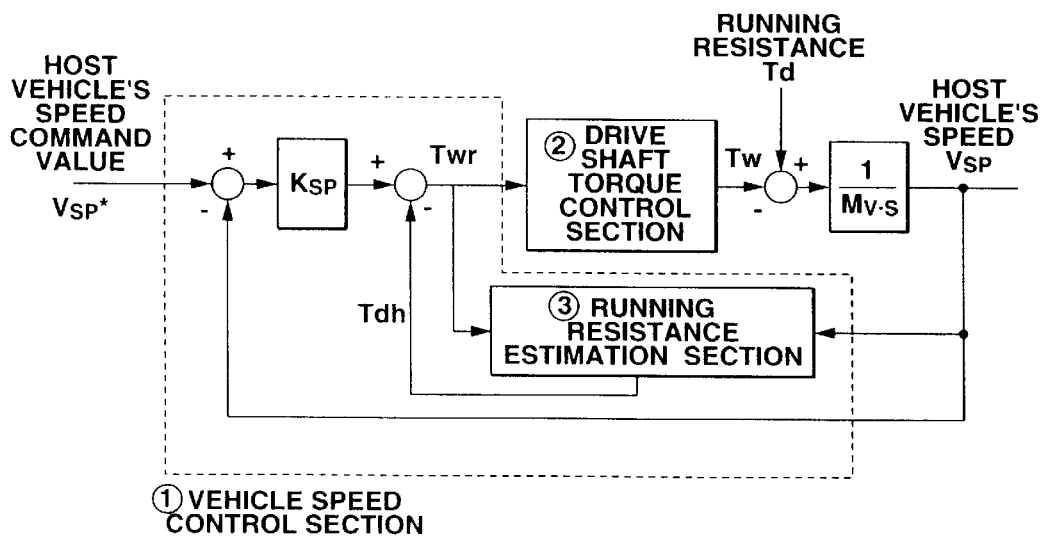
FIG. 3 is a block diagram showing a closed-loop control system containing at least a vehicle speed control section ① and a running resistance estimation section ③ and constructing an essential part of the adaptive cruise control system of the embodiment.

At step S009, arithmetic calculation for host vehicle speed control is executed within the vehicle speed control section ① shown in FIG. 3. Within vehicle speed control section ①, a braking/driving force (or a braking/driving torque) or a drive shaft torque command value Twr, which is needed to bring host vehicle's speed Vsp closer to host vehicle's speed command value Vsp*, is calculated.

Figure 4:
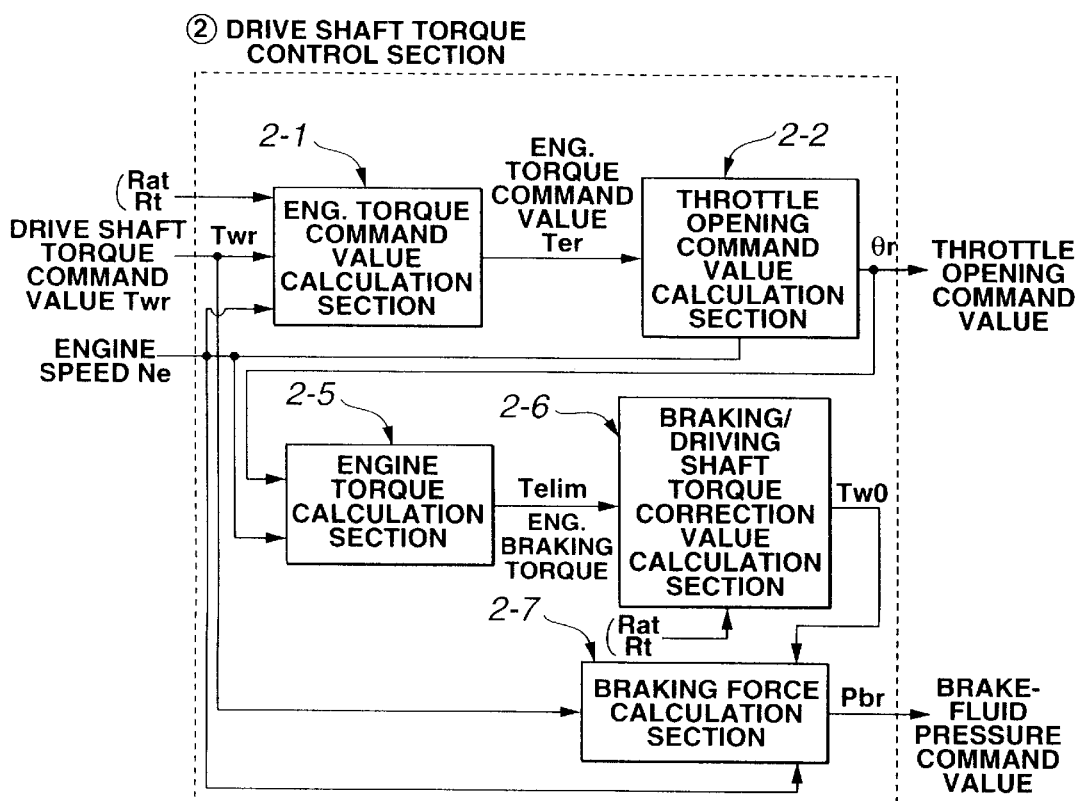
FIG. 4 is a block diagram showing arithmetic processing executed within a drive shaft torque control section ② contained in the vehicle speed control section ① shown in FIG. 3.

At step S010, arithmetic calculation for braking/driving torque control (or drive shaft torque control) is executed within the drive shaft torque control section ② shown in FIG. 4. Within drive shaft torque control section ②, the throttle opening command value θr and the brake-fluid pressure command value Pbr, which are needed to bring a braking/driving torque Tw closer to a desired braking/driving torque value substantially corresponding to drive shaft torque command value Twr, are calculated.

Details of arithmetic calculation for host vehicle speed control (see step S009) are hereunder described in reference to the block diagram shown in FIG. 3.

First of all, within vehicle speed control section ①, drive shaft torque command value Twr, which is needed to bring host vehicle's speed Vsp closer to host vehicle's speed command value Vsp*, is calculated. Second, running resistance estimation section ③ receives two input signals, namely drive shaft torque command value Twr and host vehicle's speed Vsp, and estimates the running resistance based on the two input signal values Twr and Vsp so as to derive an estimate Tdh of running resistance. It is possible to eliminate bad influences or factors exerted on the control system owing to a gradient of the sloped road surface such as an uphill grade, air resistance or wind resistance, rolling resistance, and the like, by feeding back the estimate Tdh of running resistance. The estimate Tdh of running resistance is calculated from the following expression (1).

$$Tdh = H(s) \cdot (Mv \cdot s \cdot Vsp - Twr) \quad (1)$$

where H(s) denotes a filter, Mv denotes a vehicle weight, s denotes a Laplace operator or a Laplace variable, Vsp denotes the host vehicle speed, and Twr denotes the drive shaft torque command value.

On the assumption that an unwanted disturbance signal that affects the control system's output signal is eliminated by feeding back the estimate Tdh of running resistance, a transfer characteristic from host vehicle's speed command value Vsp* to host vehicle's speed Vsp is represented by the following expression (2).

$$Vsp = \{(Ksp/Mv) \cdot Vsp^*\} / \{s + (Ksp/Mv)\} \quad (2)$$

Regarding the expression (2) representing the transfer characteristic, it is possible to match or tune the responsiveness of the host vehicle speed control system with or to a desired control responsiveness by properly setting the fixed gain Ksp for vehicle speed control section ①.

Details of arithmetic calculation for braking/driving torque control (see step S010) are hereunder described in reference to the block diagram shown in FIG. 4.

As shown in FIG. 4, drive shaft torque control section ② is comprised of an engine torque command value arithmetic-calculation section 2-1, a throttle opening command value arithmetic-calculation section 2-2, an engine torque arithmetic-calculation section 2-5, a braking/driving shaft torque correction value arithmetic-calculation section 2-6, and a braking force arithmetic-calculation section 2-7. Engine torque command value arithmetic-calculation section 2-1 arithmetically calculates an engine torque command value Ter based on drive shaft torque command value Twr, taking into account an automatic transmission operating condition, a transmission ratio of the automatic transmission, and the like. Throttle opening command value arithmetic-calculation section 2-2 arithmetically calculates throttle opening command value θr based on both engine torque command value Ter and engine speed Ne. Engine torque arithmetic-calculation section 2-5 arithmetically calculates an engine torque value $T_{elim}$, which will be hereinafter referred to as an "engine braking torque", produced when the throttle opening is a predetermined value substantially corresponding to a fully-closed position of the throttle valve, from both throttle opening command value θr and engine speed Ne. Braking/driving shaft torque correction value arithmetic-calculation section 2-6 arithmetically calculates a braking/driving shaft torque correction value $T_{w0}$ of braking/driving shaft torque produced by the engine based on engine braking torque $T_{elim}$, when the throttle opening is the predetermined value substantially corresponding to a fully-closed position of the throttle valve. Braking force arithmetic-calculation section 2-7 receives drive shaft torque command value Twr, engine speed Ne, and braking/driving shaft torque correction value $T_{w0}$, and arithmetically calculates brake-fluid pressure command value Pbr to be input into the brake-fluid servo system of brake-fluid pressure control system 5.

The drive shaft torque control system including drive shaft torque control section ② of FIG. 4 is hereunder described.

Drive shaft torque control section ② arithmetically calculates throttle opening command value θr and the brake-fluid pressure command value Pbr, both needed to realize drive shaft torque command value Twr calculated within vehicle speed control section ① shown in FIG. 3. The relationship between a driving shaft torque Tw and an engine torque Te is represented by the following expression (3).

$$Tw = Rt \cdot Rat \cdot Rdef \cdot Te - Je(dNe/dt) - Tbr \quad (3)$$

where Rt denotes a torque amplification factor of a torque converter, Rat denotes a transmission ratio of the automatic transmission, Rdef denotes a differential gear ratio, Je denotes a moment of inertia of the engine, Ne denote the engine speed, and Tbr denotes a brake torque command value Tbr (described later).

Taking into account the previously-noted expression (3), engine torque command value Ter is calculated from the following expression (4), with respect to the drive shaft torque command value Twr.

$$Ter = Je(dNe/dt) + \{Twr/(Rt \cdot Rat \cdot Rdef)\} \quad (4)$$

Throttle opening command value θr, which is needed to produce the engine torque command value Ter calculated from the previously-noted expression (4), is computed from a preprogrammed throttle opening versus engine torque characteristic map (simply, a preprogrammed engine map). By comparing the throttle opening command value θr calculated to a predetermined threshold value, a check is made to determine whether the throttle opening corresponding to throttle opening command value θr is the predetermined value, such as "0", substantially corresponding to the fully-closed position of the throttle valve. When the throttle opening command value θr is greater than 0, that is, in case of θr>0, it is possible to realize or produce a drive shaft torque corresponding to drive shaft torque command value Twr by way of only the engine torque control without using the brake control. In case of θr=0, the throttle opening is adjusted to the predetermined value substantially corresponding to the fully-closed position of the throttle valve. In this time, taking into account the drive shaft torque output by the engine with the throttle fully closed, a brake manipulated variable, which is need to bring drive shaft torque Tw closer to drive shaft torque command value Twr, is arithmetically calculated. Thus, the rule of distribution between engine torque command value Ter and brake torque command value Tbr is determined as follows. (A) In case of θr>0, brake torque command value Tbr and drive shaft torque Tw are represented by the following expressions (5) and (6).

$$Tbr = 0 \quad (5)$$

$$Tw = Rt \cdot Rat \cdot Rdef \cdot Te - Je(dNe/dt) \quad (6)$$

In this case, the system operates to produce the engine torque Te calculated from the following expression (7), with respect to the drive shaft torque command value Twr.

$$Te = Je(dNe/dt) + \{Twr/(Rt \cdot Rat \cdot Rdef)\} \quad (7)$$

(B) In case of θr=0, the engine torque Te is set at the engine braking torque $T_{elim}$ produced when θr=0. Thus, the previously discussed expression (3) is modified as the following expression (8).

$$Tw = Rt \cdot Rat \cdot Rdef \cdot T_{elim} - Je(dNe/dt) - Tbr \quad (8)$$

In this case, the system operates to produce the brake torque Tbr calculated from the following expression (9), with respect to the drive shaft torque command value Twr.

$$Tbr = -Twr + Rt \cdot Rat \cdot Rdef \cdot T_{elim} - Je(dNe/dt) \quad (9)$$

Therefore, the brake-fluid pressure command value Pbr, that is, the brake manipulated variable, is derived or calculated from the following expression (10), with respect to the brake torque command value Tbr calculated from the expression (9).

$$Pbr = Tbr/(8Ab \cdot Rb \cdot b) \quad (10)$$

The brake-fluid pressure command value Pbr, calculated from the expression (10), is used in presence of the preceding vehicle detection. Conversely, in absence of the preceding vehicle detection, the brake-fluid pressure command value Pbr is set at "0". That is, the brake control is not used, and thus the system executes the engine-torque-control-only operating mode.

The previously-discussed arithmetic operations executed within drive shaft torque control section ② is described in detail in reference to the block diagram of FIG. 4.

Within the engine torque command value arithmetic-calculation section 2-1 receives four input signals, namely drive shaft torque command value Twr, transmission ratio Rat, torque amplification factor Rt, and engine speed data Ne needed to calculate the derivative dNe/dt of engine speed Ne, and then calculates engine torque command value Ter based on the four input data Twr, Rat, Rt, and dNe/dt from the previously-discussed expression (4). Throttle opening command value arithmetic-calculation section 2-2 receives two input signals, namely engine torque command value Ter and engine speed Ne, and then calculates or retrieves throttle opening command value θr suitable to output the engine torque command value Ter from the preprogrammed engine map. After this, engine torque arithmetic-calculation section 2-5 receives two input signals, namely engine speed Ne and throttle opening command value θr, and then calculates or retrieves engine braking torque $T_{elim}$ based on the two input data Ne and θr from a preprogrammed throttle opening versus engine braking torque characteristic map. Braking/driving shaft torque correction value arithmetic-calculation section 2-6 arithmetically calculates the second term (i.e., $Rt \cdot Rat \cdot Rdef \cdot T_{elim} = T_{w0}$) of the right side of the expression (9) based on the engine braking torque $T_{elim}$. Braking force arithmetic-calculation section 2-7 receives three input signals, namely braking-driving shaft torque correction value $T_{w0}$, drive shaft torque command value Twr, and engine speed data Ne needed to calculate the derivative dNe/dt of engine speed Ne, and then executes the operation of addition of −Twr, +Rt·Rat·Rdef·$T_{elim}$, and −Je(dNe/dt) using the expression (9), so as to derive the brake torque Tbr. In addition to the above, braking force arithmetic-calculation section 2-7 calculates the brake-fluid pressure command value Pbr based on the brake torque Tbr calculated using the expression (10).

According to the adaptive cruise control system of the embodiment, when the preceding vehicle detection is absent, the control routine flows from step S001 through steps S002, S003, S004, S006, S008, and S009 to step S01. At step S004, the driver-selected vehicle speed (the set vehicle speed) set by manual operation of the driver via vehicle speed set switch 1 is determined as the desired host vehicle speed V1*. Thereafter, at step S008, the desired host vehicle speed V1* whose time rate of change is limited by the predetermined upper or lower limits, is determined as the host vehicle's speed command value Vsp*. Through step S009, drive shaft torque command value Twr that is needed to bring host vehicle's speed Vsp closer to host vehicle's speed command value Vsp*, is calculated. Subsequently to step S009, at step S010, throttle opening command value θr, which is needed to bring the braking/driving torque Tw closer to the desired braking/driving torque value substantially corresponding to drive shaft torque command value Twr, is calculated. On the other hand, brake-fluid pressure command value Pbr is set to "0". Therefore, in absence of the preceding vehicle detection, the ACC system of the embodiment executes the engine-torque-control-only operating mode, so that host vehicle's speedVsp is brought closer to host vehicle's speed command value Vsp* by way of only the engine torque control.

In contrast to the above, when switching from a state that the preceding vehicle detection is absent to a state that the preceding vehicle detection is present takes place, in flow chart of FIG. 2, the routine flows from step S001, through steps S002, S003, S005, S006, S007 and S009 to step S010. At step S005, desired host vehicle speed V1* is computed based on the actual inter-vehicle distance D, desired inter-vehicle distance D*, relative velocity ΔV of the host vehicle to the preceding vehicle, and host vehicle's speed Vsp, so that actual inter-vehicle distance D and actual relative velocity ΔV are properly adjusted to match or attain the desired inter-vehicle distance D*. At step S007, the initial value of host vehicle's speed command value Vsp* is set at a value (Vsp+ΔV1*) being offset from the current value of host vehicle speed Vsp by the predetermined value ΔV1*. Thereafter, through step S009, drive shaft torque command value Twr that is needed to bring host vehicle's speed Vsp closer to host vehicle's speed command value Vsp*, is calculated. Then, at step S010, throttle opening command value θr and brake-fluid pressure command value Pbr, which are needed to bring the braking/driving torque Tw closer to the desired braking/driving torque value substantially corresponding to drive shaft torque command value Twr, are calculated. Thus, in presence of the preceding vehicle detection, the ACC system of the embodiment executes the engine-torque-control plus brake-control operating mode, so that host vehicle's speed Vsp is brought closer to host vehicle's speed command value Vsp* by way of both the engine torque control and the brake control.

During the preceding vehicle detection after the initial value of host vehicle's speed command value Vsp* has been set at step S007, the routine flows from step S001, through steps S002, S003, S005, S006, S008, and S009 to step S010. At step S005, desired host vehicle speed V1* is computed so that actual inter-vehicle distance D and actual relative velocity ΔV are properly adjusted to match or attain the desired inter-vehicle distance D*. At step S008, the desired host vehicle speed V1* whose time rate of change is limited by the predetermined upper or lower limits, is determined as the host vehicle's speed command value Vsp*. At step S009, drive shaft torque command value Twr that is needed to bring host vehicle's speed Vsp closer to host vehicle's speed command value Vsp*, is calculated. Then, at step S010, throttle opening command value θr and brake-fluid pressure command value Pbr, which are needed to bring the braking/driving torque Tw closer to the desired braking/driving torque value substantially corresponding to drive shaft torque command value Twr, are calculated. Thus, during the preceding vehicle detection after the initial value of host vehicle's speed command value Vsp* has been set, the ACC system of the embodiment executes the engine-torquecontrol plus brake-control operating mode, so that host vehicle's speed Vsp is brought closer to host vehicle's speed command value Vsp* by way of both the engine torque control and the brake control.

Referring now to FIGS. 5A–5C, there are shown simulation results of the improved adaptive cruise control performed by the ACC system of the embodiment, when switching from the engine-torque-control-only operating mode executed in absence of the preceding vehicle detection to the engine-torque-control plus brake-control operating mode executed in presence of the preceding vehicle detection occurs. As can be appreciated from changes in host vehicle's speed Vsp and host vehicle's speed command value Vsp* within the time interval $T_A$ of FIGS. 5A–5C, when the driver operates the coast switch portion of vehicle speed set switch 1 during the adaptive cruise control based on the driver-selected host vehicle speed in absence of the preceding vehicle detection, and the host vehicle speed is gradually decreasing with the throttle fully closed and thus the vehicle is coasting, the engine-torque-control-only operating mode is continuously executed. A deceleration rate created by the engine-torque-control-only operating mode is relatively small as compared to that created by the engine-torque-control plus brake-control operating mode. During the time period $T_A$ of FIG. 5A, the actual host vehicle's speed Vsp tends to be gradually separated from host vehicle's speed command value Vsp*, and a deviation (Vsp–Vsp*) of host vehicle's speed Vsp from host vehicle's speed command value Vsp* becomes gradually greater. After this, as soon as a transition from a state of the absence of the preceding vehicle detection to a state of the presence of the preceding vehicle detection occurs at a point of time $T_B$ (preceding vehicle detecting point), the ACC system of the embodiment switches its system operating mode from the engine-torque-control-only operating mode to the engine-torque-control plus brake-control operating mode, and sets the initial value of host vehicle's speed command value Vsp* at a value being offset from the current host vehicle's speed Vsp by the predetermined value $\Delta V1^*$. If the deceleration rate of the vehicle is determined based on the comparatively great deviation (Vsp–Vsp*) between host vehicle's speed Vsp and host vehicle's speed command value Vsp* just before the preceding vehicle detecting point $T_B$, the vehicle deceleration may rapidly change after the time point $T_B$. In contrast, according to the system of the embodiment, the initial value of host vehicle's speed command value Vsp* is set at a value being offset from the current host vehicle's speed Vsp by the predetermined value $\Delta V1^*$ at the preceding vehicle detecting point $T_B$, and as a result the deviation (Vsp–Vsp*) from the initial value of host vehicle's speed command value Vsp* is decreasingly adjusted to a comparatively small deviation, that is, predetermined value $\Delta V1^*$. As set forth above, in the system of the embodiment, the deceleration rate of the vehicle is determined based on the comparatively small deviation $\Delta V1^*$ at the preceding vehicle detecting point $T_B$, and therefore the vehicle can smoothly decelerate from the preceding vehicle detecting point $T_B$ owing to the properly decreasingly compensated deviation $\Delta V1^*$, while properly suppressing changes in the vehicle deceleration (see changes in host vehicle's speed Vsp within the time interval $T_C$ of FIG. 5A). That is to say, the ACC system of the embodiment ensures a smooth transition from the engine-torque-control-only operating mode to the engine-torque-control plus brake-control operating mode. Additionally, by virtue of switching from the engine-torque-control-only operating mode suitable for a relatively small change in acceleration/deceleration to the engine-torque-control plus brake-control operating mode suitable for a relatively wide range of changes in acceleration/deceleration, the system of the embodiment ensures a high control responsiveness for a comparatively great demand for deceleration even when the preceding vehicle is detected or captured by inter-vehicle distance detector 2. In addition to the above, according to the system of the embodiment, as described previously, the predetermined value $\Delta V1^*$ is set (see the previously-noted expression $\Delta V1^* = \tau_B \times A + K_{L1}(D-D^*) + K_{V1} \cdot \Delta V$), taking into account the acceleration/deceleration value A of the host vehicle just before the transition from a state of the absence of the preceding vehicle detection to a state of the presence of the preceding vehicle detection. Thus, the system of the embodiment ensures a proper continuity between the deceleration characteristic based on only the engine torque control during coasting just before the preceding vehicle detection, and the deceleration characteristic based on the brake control as well as the engine torque control just after the preceding vehicle detection. Predetermined value $\Delta V1^*$ is also determined (see the previously-noted expression $\Delta V1^* = \tau_B \times A + K_{L1}(D-D^*) + K_{V1} \cdot \Delta V$), taking into account inter-vehicle distance D and relative velocity $\Delta V$ at the preceding vehicle detecting point $T_B$. Therefore, as can be appreciated from the acceleration/deceleration characteristic curve within the time interval $T_C$ of FIGS. 5A–5C, the decelerating operation can be initiated at once from the time point $T_B$ that the preceding vehicle is detected or captured, responsively to the behavior of the preceding vehicle.

As will be appreciated from the above, when the vehicle is in the coasting state during the adaptive cruise control that the host vehicle's speed Vsp is determined or set by manual operation of the driver via the coast switch portion of vehicle speed set switch 1, there is a limit to the deceleration rate created by means of only the engine torque control, and thus the deviation between the actual host vehicle's speed Vsp and the desired host vehicle speed V1* (or host vehicle's speed command value Vsp*) tends to become greater. That is, a demand for deceleration becomes greater. In this case, the ACC system of the embodiment quickly switches the system operating mode from the engine-torque-control-only operating mode selected in case of a relatively small change in acceleration/deceleration to the engine-torque-control plus brake-control operating mode selected in case of a relatively wide range of changes in acceleration/deceleration. Owing to quick switching from the engine-torque-control-only operating mode to the engine-torque-control plus brake-control operating mode, the host vehicle can be decelerated with a better response to the relatively large demand for deceleration. Synchronously with switching of the system operating mode, the desired host vehicle speed V1* (or the initial value of host vehicle's speed command value Vsp*) is not based on the driver-selected vehicle speed, but set at a value being offset from host vehicle's speed Vsp by predetermined value $\Delta V1^*$ in a direction decreasing of the host vehicle's speed. The ACC system of the embodiment achieves smooth switching from the engine-torque-control-only operating mode performed by the first braking-and-driving force control means to the engine-torque-control plus brake-control operating mode performed by the second braking-and-driving force control means, while ensuring a high control responsiveness for a comparatively great demand for deceleration and effectively properly suppressing changes in the host vehicle's acceleration/deceleration. Additionally, during switching from the engine-torque-control-only operating mode to the engine-torque-control plus brake-control operating mode, that is, at the switching point $T_B$ from the absence of the preceding vehicle detection to the presence of the preceding vehicle detection, predetermined value $\Delta V1^*$ that is needed to set the initial value of host vehicle's speed command value Vsp* is determined, taking into account acceleration/deceleration value A of the host vehicle just before the switching point $T_B$. This ensures a proper continuity between the acceleration/deceleration characteristic based on the engine-torque-control-only operating mode and the acceleration/deceleration characteristic based on the engine-torque-control plus brake-control operating mode, before and after the switching point $T_B$. Furthermore, the desired host vehicle speed $V1^*$ (or host vehicle's speed command value Vsp*) at the switching point $T_B$, in other words, predetermined value $\Delta V1^*$ is set, taking into account the inter-vehicle distance D and relative velocity $\Delta V$ in addition to acceleration/deceleration value A of the host vehicle just before the switching point $T_B$. This ensures a quicker acceleration/deceleration starting response to changes in the behavior of the preceding vehicle just after the switching point (the preceding vehicle detecting point) $T_B$. In the shown embodiment, an engine torque control means (that is, engine control system 6) is used as the first braking-and-driving force control means. The engine torque control means (i.e., engine control system 6) and brake torque control means (i.e., brake-fluid pressure control system 5) are both used as the second braking-and-driving force control means. Only the engine torque control means (engine control system 6) is selected in case of a relatively small demand for deceleration in absence of the preceding vehicle detection. The engine torque control means (engine control system 6) and brake torque control means (brake-fluid pressure control system 5) are both selected in case of a relatively large demand for deceleration in presence of the preceding vehicle detection. In the event that there is a transition between a state of the absence of the preceding vehicle detection and a state of the presence of the preceding vehicle detection, the system of the embodiment can give much quicker responses to two different decelerating requirements, namely a small demand for deceleration and a large demand for deceleration. The operation and effects of the ACC system of the embodiment have been discussed in the presence of switching from the engine-torque-control-only operating mode (the first braking-and-driving force control) to the engine-torque-control plus brake-control operating mode (the second braking-and-driving force control), the fundamental concept of the present invention can be applied to switching from the engine-torque-control plus brake-control operating mode (second braking-and-driving force control) to the engine-torque-control-only operating mode (first braking-and-driving force control). As previously discussed, in the shown embodiment, the engine torque control means (that is, engine control system 6) is used as the first braking-and-driving force control means, whereas the engine torque control means (engine control system 6) and brake torque control means (brake-fluid pressure control system 5) are both used as the second braking-and-driving force control means. In lieu thereof, the engine torque control means (that is, engine control system 6) may be used as the first braking-and-driving force control means, whereas the brake torque control means (brake-fluid pressure control system 5) may be used as the second braking-and-driving force control means.

The entire contents of Japanese Patent Application No. P2001-116675 (filed Apr. 16, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An adaptive cruise control system for an automotive vehicle, comprising:
    a vehicle speed detector that detects a host vehicle's speed;
    a man-machine interface that sets a desired host vehicle speed;
    a plurality of braking-and-driving force control systems that control a braking-and-driving force of the host vehicle, so that the host vehicle's speed is brought closer to the desired host vehicle speed; and
    a controller configured to be electronically connected to the vehicle speed detector, the man-machine interface, and the plurality of braking-and-driving force control systems, for executing an adaptive cruise control; the controller comprising:
    (a) a braking-and-driving force control mode selector that selects at least one braking-and-driving force control system from the plurality of braking-and-driving force control systems, depending upon a host vehicle's acceleration/deceleration required to bring the host vehicle's speed closer to the desired host vehicle speed; the braking-and-driving force control mode selector selecting a first braking-and-driving force control system when the required host vehicle's acceleration/deceleration is less than a predetermined threshold value, and selecting a second braking-and-driving force control system when the required host vehicle's acceleration/deceleration is greater than or equal to the predetermined threshold value, and
    (b) a desired host vehicle speed compensator that resets the desired host vehicle speed set at a switching point between the first and second braking-and-driving force control systems at a value being offset from the host vehicle's speed by a predetermined value when switching between the first and second braking-and-driving force control systems occurs.

2. An adaptive cruise control system for an automotive vehicle, comprising:
    an inter-vehicle distance detector that detects an inter-vehicle distance between a host vehicle and a preceding vehicle;
    a vehicle speed detector that detects a host vehicle's speed;
    a plurality of braking-and-driving force control systems that control a braking-and-driving force of the host vehicle, so that the host vehicle's speed is brought closer to a desired host vehicle speed; and
    a controller configured to be electronically connected to the inter-vehicle distance detector, the vehicle speed detector, and the plurality of braking-and-driving force control systems, for executing an adaptive cruise control; the controller comprising:
    (a) a desired inter-vehicle distance setting section that sets a desired inter-vehicle distance from the host vehicle to the preceding vehicle;
    (b) a desired host vehicle speed computation section that computes the desired host vehicle speed needed to bring the inter-vehicle distance closer to the desired inter-vehicle distance;

(c) a braking-and-driving force control mode selector that selects at least one braking-and-driving force control system from the plurality of braking-and-driving force control systems, depending upon a host vehicle's acceleration/deceleration required to bring the host vehicle's speed closer to the desired host vehicle speed; the braking-and-driving force control mode selector selecting a first braking-and-driving force control system when the required host vehicle's acceleration/deceleration is less than a predetermined threshold value, and selecting a second braking-and-driving force control system when the required host vehicle's acceleration/deceleration is greater than or equal to the predetermined threshold value, and (d) a desired host vehicle speed compensator that resets the desired host vehicle speed computed at a switching point between the first and second braking-and-driving force control systems at a value being offset from the host vehicle's speed by a predetermined value when switching between the first and second braking-and-driving force control systems occurs.

3. The adaptive cruise control system as claimed in claim 1, further comprising:

a host vehicle's acceleration/deceleration detection section that detects the host vehicle's acceleration/deceleration; and wherein:

the desired host vehicle speed compensator sets the predetermined value based on the host vehicle's acceleration/deceleration detected just before the switching point between the first and second braking-and-driving force control systems.

4. The adaptive cruise control system as claimed in claim 2, further comprising:

a host vehicle's acceleration/deceleration detection section that detects the host vehicle's acceleration/deceleration; and a relative velocity detection section that detects a relative velocity of the host vehicle to the preceding vehicle, and wherein:

the desired host vehicle speed compensator sets the predetermined value based on the host vehicle's acceleration/deceleration, the relative velocity, and the inter-vehicle distance, each detected just before the switching point between the first and second braking-and-driving force control systems.

5. The adaptive cruise control system as claimed in claim 1, wherein:

the first braking-and-driving force control system comprises an engine control system; and the second braking-and-driving force control system comprises a brake control system.

6. The adaptive cruise control system as claimed in claim 1, wherein:

the first braking-and-driving force control system comprises an engine control system; and the second braking-and-driving force control system comprises the engine control system and a brake control system.

7. The adaptive cruise control system as claimed in claim 2, wherein:

the desired inter-vehicle distance setting section calculates the desired inter-vehicle distance based on the host vehicle's speed and a predetermined inter-vehicle time substantially corresponding to an elapsed time before the host vehicle is brought into contact with the preceding vehicle.

8. The adaptive cruise control system as claimed in claim 2, wherein:

the inter-vehicle distance detector comprises a frontal object detector section that captures the preceding vehicle, and a frontal object detector signal processing circuit that receives an input signal from the frontal object detector section and processes the input signal to determine whether the preceding vehicle is present or absent; and the switching point corresponds to a switching point between a state that the preceding vehicle is absent and a state that the preceding vehicle is present.

9. A method for automatically controlling at least one of a host vehicle's speed, an inter-vehicle distance between the host vehicle and a preceding vehicle, and a relative velocity of the host vehicle to the preceding vehicle, the method comprising:

detecting the host vehicle's speed;

detecting the inter-vehicle distance;

detecting the relative velocity;

computing a first desired host vehicle speed based on a driver-selected vehicle speed;

computing a second desired host vehicle speed based on the inter-vehicle distance and the relative velocity;

setting a desired host vehicle speed at the first desired host vehicle speed when the preceding vehicle is absent;

setting the desired host vehicle speed at the second desired host vehicle speed when the preceding vehicle is present;

selecting a first braking-and-driving force control mode suitable for a first demand for acceleration/deceleration when a required host vehicle's acceleration/deceleration is less than a predetermined threshold value;

selecting a second braking-and-driving force control mode suitable for a second demand greater than the first demand for acceleration/deceleration when the required host vehicle's acceleration/deceleration is greater than or equal to the predetermined threshold value; and resetting the desired host vehicle speed computed at a switching point between the first and second braking-and-driving force control modes at a value being offset from the host vehicle's speed by a predetermined value when switching between the first and second braking-and-driving force control modes occurs.

10. The method as claimed in claim 9, wherein:

the first braking-and-driving force control mode comprises an engine-torque-control-only operating mode at which a braking-and-driving force of the host vehicle is controlled by way of only an engine control; and the second braking-and-driving force control mode comprises an engine-torque-control plus brake-control operating mode at which the braking-and-driving force of the host vehicle is controlled by way of a brake control as well as the engine control.

11. An adaptive cruise control system for an automotive vehicle, comprising:

a vehicle speed detection means for detecting a host vehicle's speed;

a man-machine interface for setting a desired host vehicle speed;

a plurality of braking-and-driving force control systems that control a braking-and-driving force of the host vehicle, so that the host vehicle's speed is brought closer to the desired host vehicle speed; and a controller configured to be electronically connected to the vehicle speed detection means, the man-machine interface, and the plurality of braking-and-driving force control systems, for executing an adaptive cruise control; the controller comprising:

(a) a braking-and-driving force control mode selecting means for selecting at least one braking-and-driving force control system from the plurality of braking-and-driving force control systems, depending upon a host vehicle's acceleration/deceleration required to bring the host vehicle's speed closer to the desired host vehicle speed; the braking-and-driving force control mode selecting means selecting a first braking-and-driving force control system when the required host vehicle's acceleration/deceleration is less than a predetermined threshold value, and selecting a second braking-and-driving force control system when the required host vehicle's acceleration/deceleration is greater than or equal to the predetermined threshold value, and (b) a desired host vehicle speed compensating means for resetting the desired host vehicle speed set at a switching point between the first and second braking-and-driving force control systems at a value being offset from the host vehicle's speed by a predetermined value when switching between the first and second braking-and-driving force control systems occurs.

12. An adaptive cruise control system for an automotive vehicle, comprising:

an inter-vehicle distance detection means for detecting an inter-vehicle distance between a host vehicle and a preceding vehicle;

a vehicle speed detection means for detecting a host vehicle's speed;

a plurality of braking-and-driving force control systems that control a braking-and-driving force of the host vehicle, so that the host vehicle's speed is brought closer to a desired host vehicle speed; and a controller configured to be electronically connected to the inter-vehicle distance detector, the vehicle speed detector, and the plurality of braking-and-driving force control systems, for executing an adaptive cruise control; the controller comprising:

(a) a desired inter-vehicle distance setting means for setting a desired inter-vehicle distance from the host vehicle to the preceding vehicle;

(b) a desired host vehicle speed computation means for computing the desired host vehicle speed needed to bring the inter-vehicle distance closer to the desired inter-vehicle distance;

(c) a braking-and-driving force control mode selecting means for selecting at least one braking-and-driving force control system from the plurality of braking-and-driving force control systems, depending upon a host vehicle's acceleration/deceleration required to bring the host vehicle's speed closer to the desired host vehicle speed; the braking-and-driving force control mode selecting means selecting a first braking-and-driving force control system when the required host vehicle's acceleration/deceleration is less than a predetermined threshold value, and selecting a second braking-and-driving force control system when the required host vehicle's acceleration/deceleration is greater than or equal to the predetermined threshold value, and (d) a desired host vehicle speed compensating means for resetting the desired host vehicle speed computed at a switching point between the first and second braking-and-driving force control systems at a value being offset from the host vehicle's speed by a predetermined value when switching between the first and second braking-and-driving force control systems occurs.

* * * * *